Nov. 4, 1958  J. H. HYLER ET AL  2,859,049
WEIGHT TRANSFERRING TOWING HITCH
Filed May 25, 1955  4 Sheets-Sheet 1

INVENTORS:
JOHN H. HYLER
ELMER E. ISGREN
ERNST W. SPANNHAKE
BY John F. Schmidt
ATTORNEY

INVENTORS:
JOHN H. HYLER
ELMER E. ISGREN
ERNST W. SPANNHAKE

ATTORNEY

Nov. 4, 1958  J. H. HYLER ET AL  2,859,049
WEIGHT TRANSFERRING TOWING HITCH
Filed May 25, 1955  4 Sheets-Sheet 4
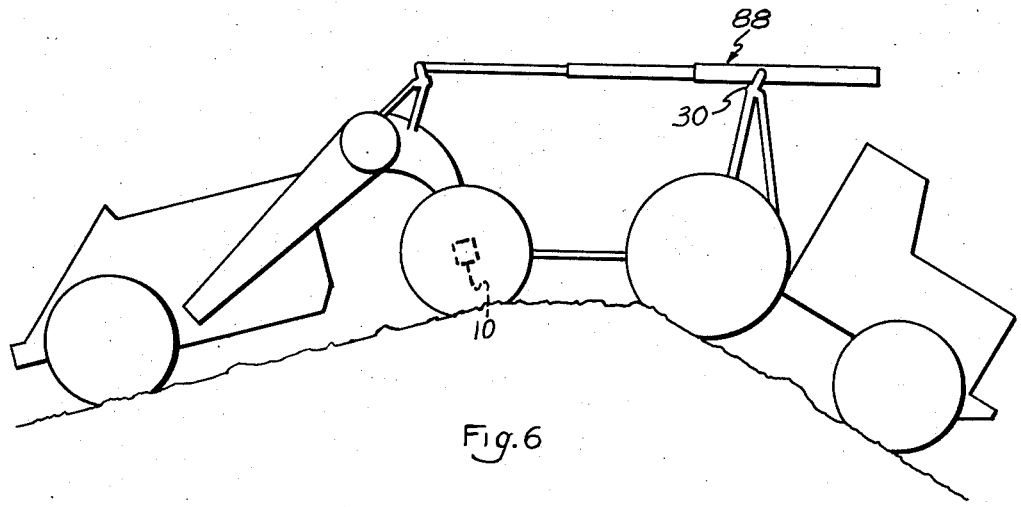
Fig.6
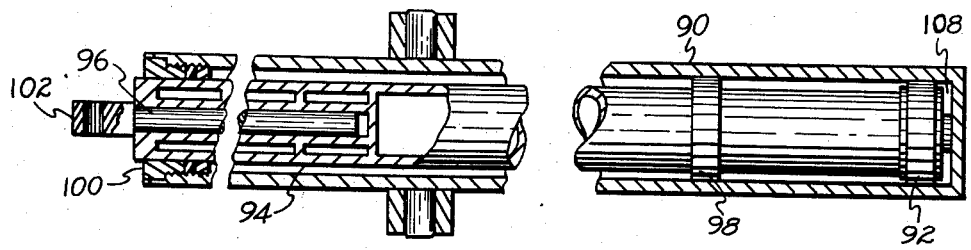
Fig.4
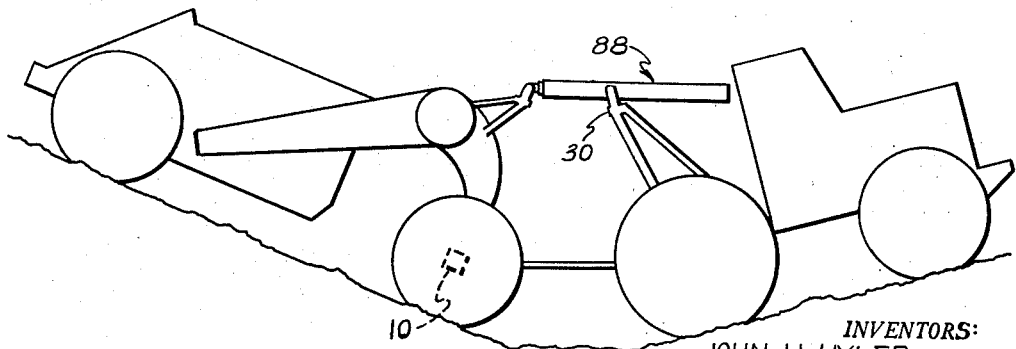
INVENTORS:

United States Patent Office 2,859,049
Patented Nov. 4, 1958

2,859,049

WEIGHT TRANSFERRING TOWING HITCH

John H. Hyler, Elmer E. Isgren, and Ernst W. Spannhake, Peoria, Ill., assignors to LeTourneau-Westinghouse Company, Peoria, Ill., a corporation of Illinois Application May 25, 1955, Serial No. 510,964

19 Claims. (Cl. 280—406)

This invention relates to a tractor-trailer coupling or hitch, especially to a hitch of the type that makes it possible to increase the traction of the tractor drive wheels.

In trains of the two-vehicle type, where only a tractor and one full trailer are involved, conditions are often encountered in which the tractor drive wheels do not have sufficient traction to pull the train. In such circumstances, drive-wheel traction can often be increased by "transfering" some of the trailer weight to the tractor— i. e. by reducing the ground pressure on the trailer front wheels. This objective is usually quite readily accomplished, but often at the expense of reduced ground pressure on the tractor front wheels. Inasmuch as the tractor front wheels provide steering for the train, there are practical limits to the amount of reduction in tractor front wheel ground pressure sustainable without loss of control from the steering standpoint. It therefore does not suffice simply to transfer weight from the trailer front wheels to the tractor rear wheels; it also becomes necessary to prevent lifting the tractor front wheels off the ground and thus prevent steering of the train.

It is accordingly an object of this invention to provide a traction-assist type of trailer hitch in which tractive effort can be increased while maintaining a substantial degree of control of the weight distribution between tractor axles. It is another object to provide a traction-assist type of hitch which permits ample articulation of the tractor and trailer and which provides sufficient space to avoid mechanical interference with other portions of the mechanism and without additional cable guides. These and other objects are accomplished in a trailer hitch having cable means which exerts a lifting effort on the trailer front end while a push-beam exerts a compressive force between the tractor rear end and the trailer front end at a level substantially higher than usual drawbar height. In a preferred form of the invention, the push-beam is a fluid pressure operated device and another fluid pressure operated device keeps the cable means taut, the two fluid pressure means being so arranged relative to each other that the pressure chamber of one of them increases in volume as the pressure chamber of the other decreases in volume for variations in the terrain, and the two fluid pressure operated mechanisms are connected to a common source of a fluid under pressure.

In the drawings:

Fig. 4 is a view in section substantially on line 4—4 of Fig. 1, but on a larger scale.

Fig. 6 is an operational view in which the dihedral angle between the ground contact planes of tractor and trailer is a reflex angle; and Fig. 7 is an operational view in which the dihedral angle is obtuse.

Figure 1:
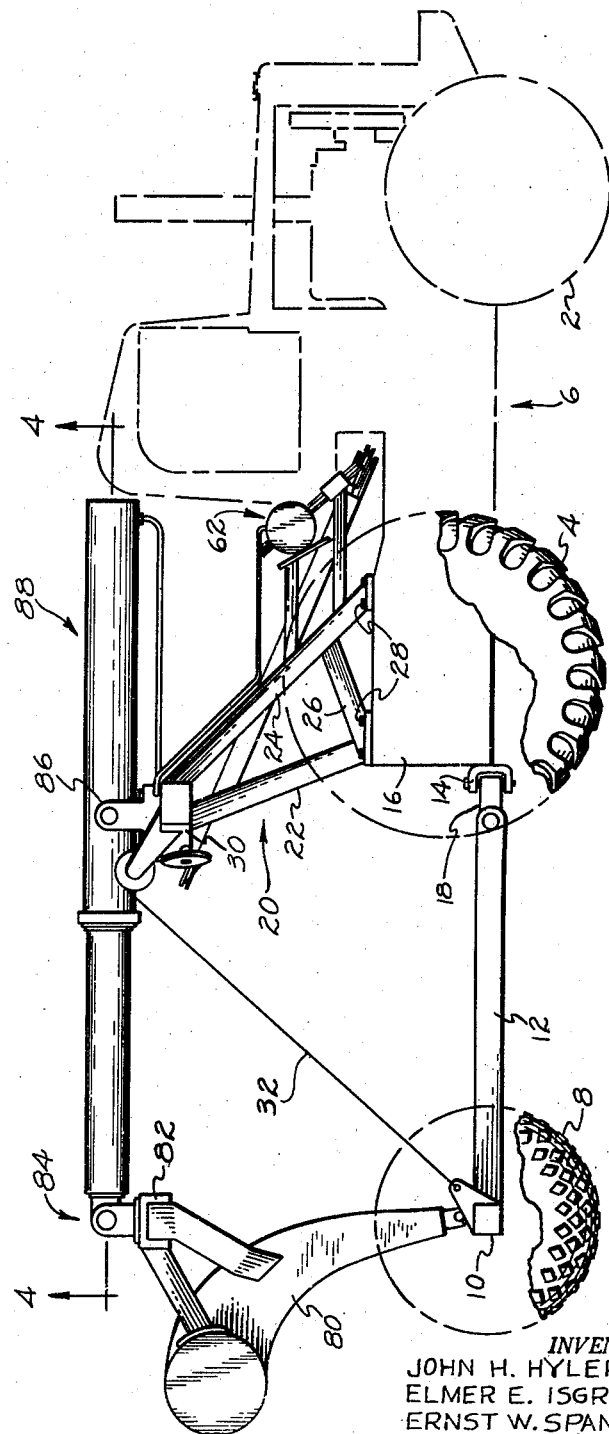
Fig. 1 is a side elevation view of a trailer hitch made according to a preferred form of the invention.

Referring now in detail to the drawings, a traction-assist device according to the invention is shown in Fig. 1 as being mounted on a tractor, much of the tractor structure being shown in phantom because the tractor details form no part per se of the invention. The tractor may be any conventional tractor having front ground supports 2, rear ground supports 4, and suitable interconnecting frame structure indicated generally at 6. The tractor is connected to tow a suitable trailing unit. The trailing unit may be conventional, having front and rear ground supports, of which the front wheels are indicated in Fig. 1 at 8. In the embodiment of the invention shown, two front wheels 8 are presumed, connected by a suitable axle 10. A towing member 12 connects axle 10 with a coupling member 14 provided at the rear end 16 of the tractor frame structure 6. Towing member 12 (here shown as a drawbar) may be connected with the coupling member 14 by means of a universal joint 18.

Mounted on the rear end 16 of the tractor is a support indicated generally at 20 and comprising a plurality of structural steel elements 22, 24, and 26 removably secured to the upper face of tractor frame 16 in any suitable manner, as for example by a plurality of cap screws 28. A transverse member 30 is secured to the upper ends of members 22 and 24 and provides support for a plurality of sheaves which form a system through which the cable of the cable means is threaded.

In the preferred embodiment of the invention illustrated, the cable means includes a cable 32 having ends 34 and 36 adapted to be connected to the trailer axle 10, or to some other equally suitable location near the front end of the trailer. Between its ends, cable 32 passes through the system of sheaves referred to above, this system being best shown in Fig. 2.

Moving from the cable ends 34 and 36 upward and forward toward the tractor, the first sheaves reached by cable 32 are the sheaves 38 and 40, these sheaves being mounted to rotate in substantially vertical planes on axes secured in any suitable manner to the transverse member 30. From sheave 38, the cable threads downward and around a sheave 42; in like manner, from sheave 40, the cable threads downward and around a sheave 44. From sheaves 42 and 44 the cable moves inward to sheaves 46 and 48, partially wrapping around those sheaves and passing forward and downward around a movable sheave 50.

As will readily be understood by those skilled in the art, sheave 50 is mounted so as to be rotatable about an axis which is movable to take up slack in cable 32. To this end, sheave 50 is mounted on a carriage 52 which moves in a track indicated generally at 54 and comprising side rails 56 and 58. The side rails 56 and 58 can conveniently be opposed channel members connected by a floor plate 60.

Figure 2:
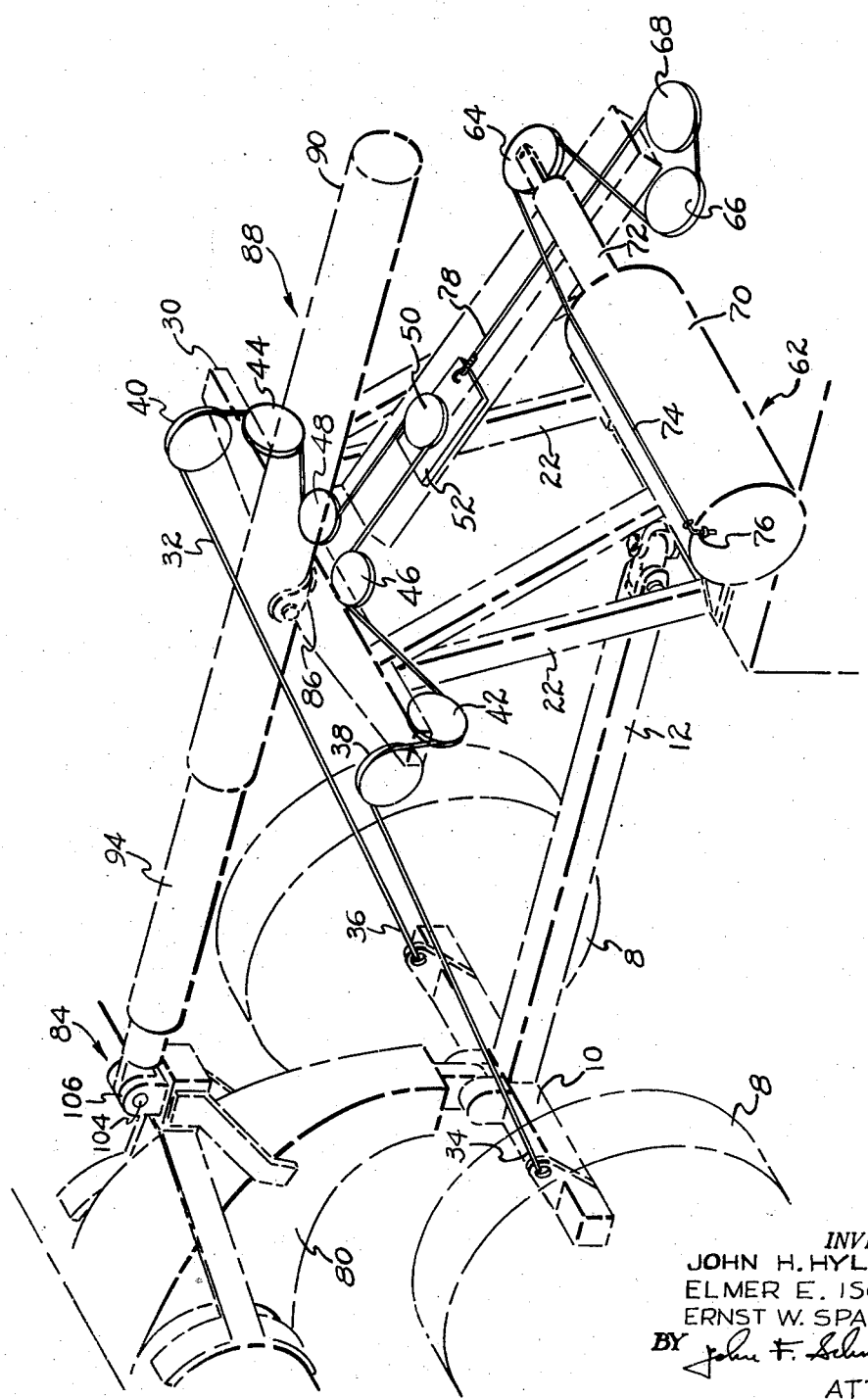
Fig. 2 is a view in perspective showing details of the cable means and the sheave system associated therewith.
Figure 3:
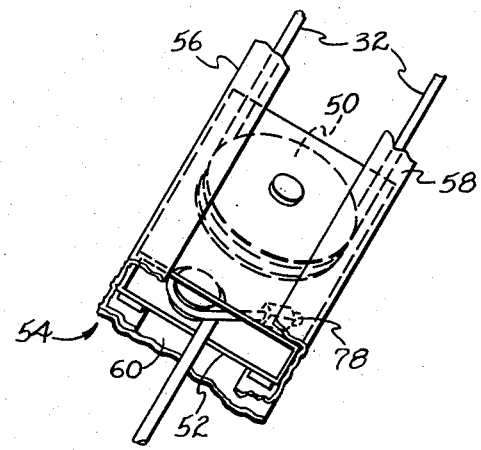
Fig. 3 is a view in perspective of details of the movable sheave carriage and track.

Means are provided to move carriage 52 and sheave 50, these means comprising a fluid pressure operated device such as the hydraulic jack shown at 62 and sheaves 64, 66, and 68. Jack 62 may be any conventional hydraulic jack having the usual cylinder 70 in which a piston 71 reciprocates to move a piston rod 72. Sheave 64 is mounted on piston rod 72. A cable 74 is anchored at one end to any suitable fixed portion of the tractor; for example, in the embodiment shown, the end 76 of cable 74 is secured to cylinder 70. Cable 74 wraps around sheaves 64, 66, and 68 and its other end 78 is secured to carriage 52. The details illustrated in Fig. 2 are schematic; the specific means of anchoring cable end 78 to carriage 52 are shown in detail in Fig. 3, but form no part per se of the invention.

Trailer front axle 10 carries the front end structural member 80 of the trailer by means of a universal joint type of connection having a horizontal pivot axis and a vertical pivot axis. Joints of this type are well known to those skilled in the art and need not be discussed here in detail. Structural member 80 carries at its upper end a support 82 for a push-beam pivot 84. Again, push-beam pivot 84 is of the universal joint type, being pivotable about two axes disposed at right angles to each other, here shown as horizontal and vertical axes. In a preferred form of the invention, the vertical axis of push-beam pivot 84 is substantially aligned with the vertical axis of the pivot by which structural member 80 is mounted on axle 10.

Support 20 carries at its upper end a saddle 86 which is pivotally mounted about a substantially vertical axis on transverse member 30. Saddle 86 provides a horizontal pivot for a push-beam indicated generally at 88. In a preferred form of the invention, push-beam 88 is a hydraulic jack having a cylinder 90, a suitable packed piston 92 reciprocable in cylinder 90 and toward that end mounted on a hollow piston rod 94, and a rod extension 96 provided in the hollow of piston rod 94. Piston rod 94 carries secured to it a stop collar 98 adapted, at the extreme leftward (as seen in Fig. 4) movement of piston rod 94 to abut against the cylinder closure member 100. Rod extension 96 carries a coupling member 102 which is adapted to cooperate with the trailer push-beam pivot 84. More specifically, a pin 104 engages a bifurcated member 106 which is an element of the pivot 84 and also engages coupling member 102 by means of a suitable opening provided therein.

Figure 5:
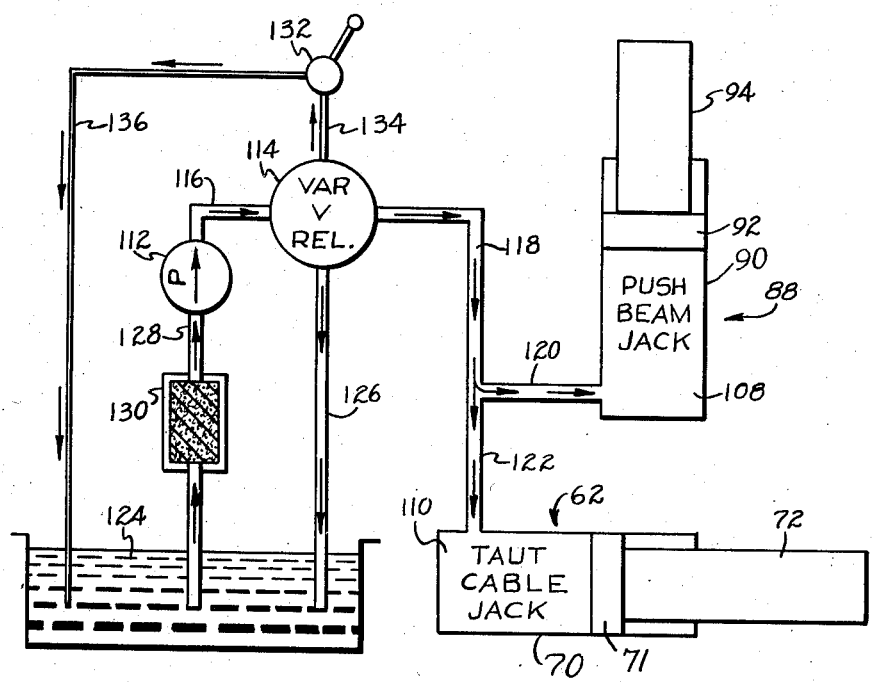
Fig. 5 is a schematic view showing the piping diagram of the fluid pressure operated means and the source of fluid under pressure.

Reference will now be made to Fig. 5 for a consideration of the fluid pressure system. It will of course be appreciated by those skilled in the art that the showing in Fig. 5 is schematic. The push-beam jack 88 and taut cable jack 62 are shown as having fluid pressure chambers 108 and 110 respectively. These pressure chambers are connected with a source of fluid under pressure by suitable conduit means. More specifically, a hydraulic pump 112 discharges hydraulic fluid under pressure to a variable relief valve 114 by means of a conduit 116. Valve 114 is connected to discharge fluid under pressure through a conduit 118 and branch conduits 120, 122, to pressure chambers 108 and 110 respectively. Valve 114 is also connected to discharge fluid at relief pressure to the tank 124 by way of a conduit 126. Pump 112 is connected to take fluid from tank 124 through a conduit 128, in which there is disposed a suitable filter 130.

It was noted above that valve 114 is a variable pressure relief valve. This may be any one of a number of such valves available in industry; one such valve that has been found satisfactory is one made by the Denison Manufacturing Company of Columbus, Ohio, identified by catalogue number RV 101103A.

Means are provided to control the pressure at which valve 114 relieves, these means being shown schematically in Fig. 5 as a remotely-controlled, hand-operated valve 132. Valve 132 is connected with valve 114 by a control conduit 134 and with tank 124 by a conduit 136.

As before, valve 132 may be any one of a number of such valves. Denison valve catalogue number RE-021122B has been found satisfactory.

Operation

Referring now particularly to Figs. 2, 6, and 7, the operation of the illustrated embodiment of the invention will be reviewed briefly. In Fig. 6, the tractor and trailer are shown in such a position that the dihedral angle between the ground contact planes of the tractor and trailer, as measured above the ground, is greater than 180°. Such an angle is known as a reflex angle. In Fig. 7, the dihedral angle is less than 180° but greater than 90°, and is known as obtuse. It will be evident from a study of Figs. 2, 6, and 7 that the distance between the front axle 10 of the trailer and the transverse member 30 carrying sheaves 38 and 40 decreases as the train changes from the position shown in Fig. 6 to the position shown in Fig. 7. (The sheaves and cables are omitted from Figs. 6 and 7.) Referring especially to Fig. 2, it will be seen that the decreasing distance between transverse member 30 and trailer front axle 10 will require movement downward and to the right (as seen in Fig. 2) of carriage 52 and its sheave 50 if the cable is to remain tight. Sheave 50 and its carriage 52 can be moved in this manner only by expansion of the pressure chamber in cylinder 62, moving piston rod 72 and sheave 64 away from cylinder 62.

At the same time that pressure chamber 110 in cylinder 62 is increasing during the change from the Fig. 6 position to the Fig. 7 position, the two points of attachment 84 and 86 of push-beam 88 are coming closer together, with the result that pressure chamber 108 in cylinder 90 is decreasing in volume. Thus it will be seen that, as the dihedral angle varies between a reflex value and an obtuse value, one pressure chamber decreases in volume while the other increases in volume. As can be seen in Fig. 5, the system formed by these interconnected jacks is itself connected with a source of fluid under pressure, namely pump 112, which stands always ready to supply fluid for all volume increases that take place in the system, and any makeup fluid that may be lost through leakage. The system is always protected against excessive pressure by relief valve 114 which is controlled by valve 132, and of course valve 114 opens to discharge excess fluid to tank 124 when the volume of the high pressure portion of the hydraulic system decreases.

Figures 6 and 7, and the accompanying description, disclose and discuss two extreme positions which the mechanism may take in its operation. It should not be assumed that these are the only positions in which the equipment may find itself or in which it will function successfully. For example, the invention will operate successfully in situations where the ground contact planes are parallel, with the tractor ground contact plane being either above or below the ground contact plane of the trailer. In situations of this type, the trailer hitch takes the form of a parallelogram. This type of situation can be combined with the reflex and obtuse situations shown in Figures 6 and 7, depending of course on the terrain. It may also be noted that a hitch made according to this invention permits the train vehicles to assume any and all positions of articulated vehicles. Other variations will be apparent to those skilled in the art.

From a study of the foregoing, it will appear that the traction of drive wheels 4 may be increased by increasing the tension of cable 32. This is done by means of jack 62. However, this alone would have a tendency to pivot the tractor counterclockwise as seen in the drawings about its rear axle, diminishing the ground pressure on front wheels 2 and reducing the steerability of the train. Push-beam 88 applies a compressive force to the upper end of support 20 which tends to turn the tractor clockwise about its rear axle and thus opposes the tendency toward counterclockwise movement referred to above. This is accomplished by push-beam 88.

Although in the vast majority of situations, it will be found desirable to keep the tractor front wheels 2 in contact with the ground, if the operating conditions call for an absolute maximum of traction, the traction-assist device can be operated to relieve ground pressure on wheels 2 completely, at which time the tractor can be steered by individually braking the drive wheels. This manner of steering is well understood and needs no detailed discussion.

It will be seen and understood from the foregoing that support 20 is at a substantial height above the drawbar, which in the embodiment shown is close to the ground. The push-beam 88 is thus connected with the tractor and the trailer at a height substantially above drawbar level, by which it is meant that a force exerted on the tractor by the push-beam, taken with the pull of the drawbar or the cable, because of the distance between these forces, exerts a couple on the tractor which is effective as aforesaid to keep the steerable wheels down.

It will be evident from the foregoing that we have provided a relatively simple and effective device to transfer weight from a trailer front end to its tractor traction wheels without sacrificing front wheel ground pressure. Other advantages will be apparent to those skilled in the art.

We claim:

1. A traction-assist device for a tractor and trailer, said device comprising: means to lift at least a portion of the trailer relative to the tractor including a cable having ends adapted to be connected to the trailer, a system of sheaves on the tractor through which the cable passes between its ends and including a sheave mounted for movement to take up slack in the cable, a carriage on which the last-named sheave is mounted and movable to provide said sheave movement, and means to move the carriage; and an extensible push-beam connected to the tractor rear end and trailer front end and operable to keep the tractor forward ground support in contact with the ground.

2. In a device as in claim 1, fluid pressure operated means connected to move the carriage, the extensible push-beam comprising other fluid pressure operated means, and a source of fluid under pressure connected and common to both fluid pressure operated means.

3. A traction-assist device for a tractor and trailer, said device comprising: means to lift at least a portion of the trailer relative to the tractor including a cable having ends adapted to be connected to the trailer, a system of sheaves on the tractor through which the cable passes between its ends and including a sheave mounted for movement to take up slack in the cable, a carriage on which the last-named sheave is mounted and movable to provide said sheave movement, means to move the carriage and including another cable and fluid pressure operated means operable by fluid under pressure to move the carriage in a direction to take slack out of the first-named cable, and a source of fluid under pressure connected to the fluid pressure operated means; and an extensible push-beam connected to the tractor rear end and trailer front end.

4. A traction-assist device for a steerable tractor and a trailer connected by a towing member, said device comprising: a support mounted on the tractor at a substantial height above the level of the towing member; a cable having ends adapted to be connected to the trailer at approximately the height of the towing member; a system of sheaves through which the cable passes between its ends, including a pair of sheaves mounted at the top of said support and another sheave mounted for movement to take up slack in the cable; means to move the movable sheave and thereby to exert a lifting force tending to impair tractor steerability; and an extensible push-beam carried by the tractor at the top of said support and connected to the trailer front end and operable to exert a push between its points of attachment with the support and the trailer to restore steerability.

5. A traction-assist device for a tractor and trailer and comprising: a support mounted on the tractor at a substantial height above the ground; a cable having ends adapted to be connected to the trailer at a level well below said substantial height; a system of sheaves through which the cable passes between its ends, including a pair of sheaves mounted at the top of said support and another sheave mounted for movement to take up slack in the cable; means to move the movable sheave and thereby tending to lift one end of the tractor; and means to offset said tendency including an extensible push-beam mounted at the top of the support and connected to the trailer front end and operable to exert a push between its points of attachment with the support and the trailer.

6. A traction-assist device for a tractor and trailer and comprising: a support mounted on the tractor at a substantial height above the ground; a cable having ends adapted to be connected to the trailer at a level well below said substantial height; a system of sheaves through which the cable passes between its ends, including a pair of sheaves mounted at the top of said support and another sheave mounted for movement to take up slack in the cable; fluid pressure operated means to move the movable sheave and thereby tending to lift one end of the tractor; means to offset said tendency including a fluid pressure operated extensible push-beam mounted at the top of the support and connected to the trailer front end; and a source of fluid under pressure common and connected to both fluid pressure operated means.

7. A device as in claim 6, in which the fluid pressure source includes a variable pressure relief valve, and means to control the pressure at which said valve opens.

8. A traction-assist device for a tractor and trailer comprising a cable connected to the front end of the trailer, means to put the cable under tension in a direction having a component tending to lift the tractor and trailer front ends, means to mount the cable tension means on the tractor, and an extensible push-beam connected to the tractor rear end and trailer front end and operable to keep the beam under compression to offset the tendency to lift the tractor front end.

9. A traction-assist device for a tractor and trailer comprising a cable connected to the front end of the trailer, means to put the cable under tension in a direction having a component tending to lift the tractor and trailer front ends and including fluid pressure operated means, means to mount the cable tension means on the tractor, and a fluid pressure operated extensible push-beam connected to the tractor rear end and trailer front end to offset the tendency to lift the tractor front end.

10. A device as in claim 9, and a source of fluid under pressure common and connected to both fluid pressure operated means.

11. A traction-assist device for a tractor having front and rear ground supports and a trailer having front and rear ground supports and wherein the dihedral angle between the ground contact planes of tractor and trailer can be varied between an obtuse value and a reflex value, the device comprising: a cable connected to the trailer front end; means to maintain the cable under tension and tending to impair tractor steerability, including fluid pressure operated means adapted alternately to receive and discharge fluid under pressure; means to mount the cable tension means on the tractor; means to restore tractor steerability including; a fluid pressure operated extensible push-beam connected to the tractor rear end and trailer front end and adapted alternately to discharge and receive fluid under pressure; and means mechanically and hydraulically so interconnecting the two fluid pressure operated means that one of them discharges fluid as the other receives fluid while the aforesaid dihedral angle varies.

12. A device as in claim 11, and a source of fluid under pressure connected with the interconnecting means.

13. In a device as in claim 11, a source of fluid under pressure; and means connecting said source with the interconnecting means, including a variable pressure relief valve and means to control the pressure at which the valve relieves.

14. A traction-assist device for a tractor having front and rear ground supports and a trailer having front and rear ground supports and wherein the dihedral angle between the ground contact planes of tractor and trailer can be varied between an obtuse value and reflex value, the device comprising: a cable connected to the trailer front end; means to maintain the cable under tension and tending to impair tractor steerability, including fluid pressure operated means adapted alternately to receive and discharge fluid under pressure; means to mount the cable tension means on the tractor; means to restore tractor steerability including a fluid pressure operated extensible push-beam connected to the tractor rear end and trailer front end and adapted alternately to discharge and receive fluid under pressure; and means interconnecting the two fluid pressure operated means.

15. A traction-assist device for a tractor and trailer comprising means to lift the trailer front end relative to the tractor, means to mount said lifting means on the tractor, and an extensible push-beam independent of the lifting means and connected to the tractor rear end and trailer front end and operable to keep the beam under compression.

16. A traction-assist device for a tractor and trailer comprising means to lift the trailer front end relative to the tractor, and including an expansible chamber device adapted alternately to receive and discharge fluid under pressure, means to mount said lifting means on the tractor, expansible chamber means connected to the tractor rear end and trailer front end and adapted alternately to receive and discharge fluid under pressure, means mechanically and hydraulically interconnecting the expansible chamber device and the expansible chamber means such that one receives fluid under pressure as the other discharges fluid under pressure, and a source of fluid under pressure connected to the interconnecting means.

17. A traction-assist device for a tractor and trailer connected by a drawbar, the device comprising means connected to the trailer at drawbar level to lift the trailer front end relative to the tractor, means to mount the lifting means on the tractor, and an extensible push-beam independent of the lifting means and connected to the tractor rear end and to the trailer front end, the tractor connection being at a level substantially above drawbar level, and operable to keep the beam under compression.

18. A traction-assist device for a tractor and trailer comprising cable means to lift the trailer front end relative to the tractor, means to mount said lifting means on the tractor, and an extensible push-beam independent of the lifting means and connected to the tractor rear end and trailer front end and operable to keep the push-beam under compression.

19. A traction-assist device for a tractor and trailer connected by a drawbar, the device comprising cable means connected to the trailer at drawbar level to lift the trailer front end relative to the tractor, means to mount the lifting means on the tractor, and an extensible push-beam independent of the lifting means and connected to the tractor rear end and to the trailer front end, the tractor connection being at a level substantially above drawbar level, and operable to keep the beam under compression.

References Cited in the file of this patent
UNITED STATES PATENTS

| | | |
|---|---|---|
| 2,360,901 | Simmons | Oct. 24, 1944 |
| 2,363,179 | Harrington | Nov. 21, 1944 |
| 2,718,410 | Simmons | Sept. 20, 1955 |
| 2,719,730 | Beck | Oct. 4, 1955 |